US008677041B2

(12) United States Patent  (10) Patent No.: US 8,677,041 B2
Doering  (45) Date of Patent: Mar. 18, 2014

(54) BALANCING LOADS OF A PLURALITY OF BUS LANES OF A SNOOPING-BASED BUS USING A RECEIVER, ANALYZER, AND CONTROLLER

(75) Inventor: Andreas Christian Doering, Zufikon (CH)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/221,051

(22) Filed: Aug. 30, 2011

(65) Prior Publication Data

US 2012/0054450 A1    Mar. 1, 2012

(51) Int. Cl.
 *G06F 12/00*    (2006.01)
(52) U.S. Cl.
 USPC ........... 710/240; 711/146; 718/105; 709/235; 370/235; 370/332
(58) Field of Classification Search
 USPC ........... 710/240; 711/146; 718/105; 709/235; 370/235, 332
 See application file for complete search history.

(56) References Cited

U.S. PATENT DOCUMENTS

| 6,081,883 | A  | * | 6/2000 | Popelka et al. ................ 712/28 |
| 6,202,103 | B1 | * | 3/2001 | Vonbank et al. ............... 710/15 |
| 6,253,234 | B1 | * | 6/2001 | Hunt et al. .................... 709/213 |
| 6,487,621 | B1 | * | 11/2002 | MacLaren .................... 710/240 |
| 6,831,575 | B2 |   | 12/2004 | Wu et al. |
| 6,981,074 | B2 | * | 12/2005 | Oner et al. ..................... 710/32 |
| 2007/0165622 | A1 | * | 7/2007 | O'Rourke et al. ........... 370/389 |

* cited by examiner

*Primary Examiner* — Hong Kim
(74) *Attorney, Agent, or Firm* — Vazken Alexanian (57) ABSTRACT

A method and system for balancing loads of a plurality of bus lanes of a snooping-based bus. The system includes: a receiver for receiving snoop transactions from the bus lanes, each of the snoop transactions having a snoop request and at least one snoop response, an analyzer for analyzing respective actual and expected loads of each of the bus lanes dependent on the received snoop transactions, and a controller for providing a next snoop request from a number of outstanding snoop requests to a buffer allocated to the system, where the buffer is dependent on the analyzed loads of the bus lanes.

16 Claims, 6 Drawing Sheets

BALANCING LOADS OF A PLURALITY OF BUS LANES OF A SNOOPING-BASED BUS USING A RECEIVER, ANALYZER, AND CONTROLLER

CROSS-REFERENCE TO RELATED APPLICATION

This application claims priority under 35 U.S.C. §119 from European Patent Application No. 10174777.2 filed Aug., 31, 2010, now abandoned, the entire contents of which are incorporated herein by reference.

BACKGROUND OF THE INVENTION

1. Field of the Invention

The invention relates to load balancing. More particularly, the invention relates to balancing loads of a plurality of bus lanes of a snooping-based bus.

2. Related Art

A snooping-based bus or fabric and the units or processing units coupled to the snooping-based bus can form a cache coherent system. Such a cache coherent system can use a cache coherency protocol. An example for such a cache coherency protocol is PowerBus.

In a cache coherent system, a plurality of memory accesses of the processing units needs to be kept coherent with the caches of the other processing units. One method to achieve this is the usage of snooping cache coherency protocols.

Using such a snooping cache coherency protocol means that the address for each access is distributed to all relevant processing units which can check whether they have a copy of the effected data item in their local cache and which state, e.g. shared, exclusive, modified, it is in.

The address can be distributed by a requesting processing unit by means of a snoop request or snoop command. In response to the snoop request, the requesting processing unit receives snoop responses from the other bus-coupled processing units. In this regard, all the responses can be collected by the bus and a combined answer can be either sent to the requesting processing unit or, like in PowerBus, distributed to all bus-coupled processing units.

While the data of a snoop transaction, including a snoop request and snoop responses, is conventionally transferred point to point, the snooping information consists of one or two, one-to-many, and a many-to-one steps. Therefore, a very high rate of snoop requests need to be delivered to the processing units of a bus coupled to a plurality of processing units.

To achieve this, parallel bus lanes are used, and a hash function determines which bus lane is to be used dependent on the address of the snoop request. The bus, in particular a bus access unit of the bus, collects the snoop requests from a plurality of processing units and arbitrates them onto the lanes for snooping.

Even if by randomness and quality of the used hash function, the average load on the bus lanes is the same, it can happen that some bus lanes are higher loaded than other bus lanes in the short term. These short term hot spots can limit the utilization of the bus.

One way to reduce these short-term hot spots is to increase the buffer sizes in the bus. This can allow the bus to see a larger set of requests to choose from. However, these buffers are redundant with the control structures within the processing units which have to keep track of their outstanding transactions disadvantageously.

Document U.S. Pat. No. 6,304,945 B1 describes a method and an apparatus for maintaining cache coherency in a computer system having multiple processor busses. The computer system includes a plurality of processor buses, and a memory bank. The plurality of processors is coupled to the processor buses. At least a portion of the processors have associated cache memories arranged in cache lines. The memory bank is coupled to the processor buses. The memory bank includes a main memory and a distributed coherency filter. The main memory is adapted to store data corresponding to at least a portion of the cache lines. The distributed coherency filter is adapted to store coherency information related to the cache lines associated with each of the processor buses. A method for maintaining cache coherency among processors coupled to a plurality of processor buses is provided. Lines of data are stored in a main memory. A memory request is received for a particular line of data in the main memory from one of the processor buses. Coherency information is stored related to the lines of data associated with each of the processor buses. The coherency information is accessed based on the memory request.

SUMMARY OF THE INVENTION

One aspect of the invention is a system for balancing loads of a plurality of bus lanes of a snooping-based bus. The system includes: a receiver for receiving snoop transactions from the bus lanes, each of the snoop transactions having a snoop request and at least one snoop response, an analyzer for analyzing respective actual and expected loads of each of the bus lanes dependent on the received snoop transactions, and a controller for providing a next snoop request from a number of outstanding snoop requests to a buffer allocated to the system, where the buffer is dependent on the analyzed loads of the bus lanes.

Yet another aspect of the invention is a method for balancing loads of a plurality of bus lanes of a snooping-based bus. The method including the steps of: receiving snoop transactions from the bus lanes, each of the snoop transactions having a snoop request and at least one snoop response, analyzing respective actual and expected loads of each of the bus lanes dependent on the received snoop transactions, and providing a next snoop request from a number of outstanding snoop requests to a buffer allocated to the snooping-based bus, where the buffer is dependent on the analyzed loads of the bus lanes.

BRIEF DESCRIPTION OF THE DRAWINGS

In the following, exemplary embodiments of the present invention are described with reference to the enclosed figures.

DETAILED DESCRIPTION OF PREFERRED EMBODIMENTS

Like or functionally alike elements in the figures have been allocated the same reference signs if not otherwise indicated.

According to a first aspect of the invention, an arbiter for balancing loads of a plurality of bus lanes of a snooping-based bus is suggested.

The arbiter has a receiver, an analyzer and a controller. The receiver can be configured to receive snoop transactions from the bus lanes. Each of the snoop transactions can have a snoop request and at least one snoop response. The analyzer can be configured to analyze respective actual and expected loads of each of the bus lanes dependent on the received snoop transactions. The controller can be configured to provide a next snoop request from a number of outstanding snoop requests to a buffer allocated to the arbiter dependent on the analyzed loads of the bus lanes.

The arbiter can be any arbitrating means. The receiver can be any receiving means. Furthermore, the analyzer can be any analyzing means. Moreover, the controller can be any controlling means.

The respective means, in particular the arbiter, the receiver, the analyzer and the controller can be implemented in hardware or in software.

If the means are implemented in hardware, it can be embodied as a device, e.g. as a computer or as a processor or as a part of a system, e.g. a computer system.

If the means are implemented in software it can be embodied as a computer program product, as a function, as a routine, as a program code or as an executable object.

In some implementations, the arbiter can choose the next request or next requests to be issued depending on the current and expected load per bus lane. In particular, the arbiter can be part of a processing unit of a plurality of processing units being coupled to the bus.

The processing unit having the arbiter can further comprise an interface for interfacing with the bus lanes of the plurality of bus lanes. Since the processing unit has the interface or snoop interface per bus lane, it can observe and measure on each bus lane. Furthermore, the processing unit can count the number of snoop requests or snoop commands per bus lane, it submitted to the bus but did not see on the snoop interface yet.

In an embodiment, the controller is configured to provide that snoop request to the allocated buffer next, which is allocated to a less loaded bus lane of the plurality of bus lanes according to the analyzed loads of the bus lanes.

For example, for the bus lane with the minimum actual load, the controller can provide the next snoop request to the allocated buffer. According to another example, for a bus lane having an actual load being smaller than a predefined threshold, the controller can provide the next snoop request or next snoop requests to the allocated buffer.

In a further embodiment, the receiver can have a plurality of interfaces. Each of the plurality of interfaces can be coupled to an allocated bus lane of the plurality of bus lanes, where each of the plurality of interfaces being configured to receive snoop responses from the allocated bus lane.

In a further embodiment, the analyzer can be configured to analyze the respective load of the allocated bus lane of the plurality of bus lanes dependent on the snoop responses received by the allocated interfaces.

In a further embodiment, the analyzer can have a plurality of counter entities. Each counter entity of the plurality of counter entities can be allocated to one bus lane of the plurality of bus lanes, where each counter entity provides at least one count relating to the snoop transactions of the allocated bus lane.

In a further embodiment, the controller can be configured to provide the next snoop request to the allocated buffer in dependence on the counts provided by the counter entities and the outstanding snoop requests.

In a further embodiment, each counter entity can have a first counter, a second counter and a third counter.

The first counter can be configured to provide a count relating to outstanding snoop requests for the allocated bus lane. The second counter can be configured to provide a count relating to pending snoop transactions of the allocated bus lane. The third counter can be configured to provide a count relating to snoop responses received from the allocated bus lane.

For example, the outstanding snoop requests can be requests waiting for snoop. For example, the third counter can count arrived snoops during a predefined number of time cycles.

In a further embodiment, the controller is configured to provide the next snoop request to the allocated buffer in dependence on the counts of the first, the second and the third counters of the counter entities.

In a further embodiment, the arbiter can further have an interface being coupled to the allocated buffer. The interface can be configured to receive a snoop request grant signal from the allocated buffer. The snoop request grant signal can indicate the last snoop request forwarded from the allocated buffer to the snooping-based bus.

For example, the snoop request grant signal can be embodied as a command grant signal in PowerBus. The command grant signal can function as a flow control for command submission to the allocated buffer and therefore to the bus. In particular, the arbiter can use information from this command grant signal, which can be faster than the snoop feedback. In particular, faster means that the arbiter receives the command grant signal earlier than the snoop transactions.

In a further embodiment, the controller can be configured to provide the next snoop request to the allocated buffer in dependence on the counts provided by the counter entities, the outstanding snoop requests and the received snoop request grant signals.

According to a second aspect of the invention, a processing unit for communicating towards a plurality of bus lanes of a snooping-based bus is suggested. The processing unit can have an interface and an arbiter as described above. The interface can be configured to interface with the bus lanes of the plurality of bus lanes. The arbiter can be configured to balance loads of the plurality of bus lanes.

In some implementations, the processing unit can be embodied as a bus terminal. The bus terminal can keep track of the commands, in particular, the snoop requests and the snoop responses, in flight per bus lane and can prefer new commands to be issued that use the lower-loaded bus lane or lanes.

According to a third aspect of the invention, an arrangement is suggested. The arrangement can have a snooping-based bus with a plurality of bus lanes and a plurality of above described processing units for communicating towards the plurality of bus lanes.

According to a fourth aspect of the invention, a multi-core processor with an above described arrangement is suggested.

According to a fifth aspect of the invention, a method for balancing loads of a plurality of bus lanes of a snooping-based bus is suggested. The method has a step of receiving snoop transactions from the bus lanes, a step of analyzing respective actual and expected loads of each of the bus lanes dependent on the received snoop transactions, and a step of providing a next snoop request from a number of outstanding snoop requests to a buffer allocated to the snooping-based bus dependent on the analyzed loads of the bus lanes. Each of the snoop transactions can have a snoop request and at least one snoop response.

According to a sixth aspect of the invention, the invention relates to a computer program comprising a program code for executing the method for balancing loads of a plurality of bus lanes of a snooping-based bus when run on at least one computer.

In the sense of the present invention, a snoop transaction having a snoop request and at least one snoop response includes the whole process beginning from sending a snoop request, like a read request or a write request, from a requesting unit and ending with receiving all the snoop responses from the potential destination units or one combined response of the responses of the potential destination units. Therefore, a snoop transaction includes the sending of the initiating snoop request to all potential destination units, in particular to all bus-coupled units local to the same nodal coherence domain and/or to all units coupled to the fabric. The potential destination units are adapted to snoop the request and to generate a personal response.

All responses are adapted to be sent back to the requesting unit and are further adapted to be combined to the one response dependent on definite, predefined logical rules. On the basis of the received response or received responses, the requesting unit has the ability to detect the right destination unit and to detect which snoop request is distributed next. The destination in the case of a read request is the source of data to be transferred. Accordingly, the destination in case of a store request is the sink of data to be transferred.

A snoop transaction includes a snoop request having a request identifier identifying a request type, control data and an address field indicating an address for the snoop request and corresponding snoop responses and is used in order to maintain coherency in the snooping-based bus or processor fabric. Therefore, the requestor of such a snoop transaction sends the snoop request to all possible destinations in the system.

The possible destinations or destination units snoop the request and create the response or snoop response. In this regard, the possible destination units check, if they have the cache line of the address indicated by the address field in their cache and if the requestor can proceed with its request or not. The snoop responses are routed back to the requestor or to a centralized arbiter who determines the final response of the request.

In the following, two different scenarios are described illustrating advantages according to some implementations.

Both scenarios are described for two bus lanes. For a person skilled in the art, it can be evident how to generalize to more than two bus lanes.

In a first scenario, one processing unit A can generate snoop requests at a high rate for one bus lane and few snoop requests for the other bus lane. The other units can not generate any snoop requests. The counters can indicate that the load is due to the unit A only, hence unit A gets a new snoop request for the highly-loaded lane, unit A can block the snoop request until the number of outstanding snoop requests drops below a certain level or threshold. On the other hand, the requests for the low-loaded bus lanes are issued immediately. A limitation of snoop requests to the highly loaded bus lane can imply that snoop requests to the low-loaded bus lane can be issued.

In a second scenario, several units can generate snoop requests at a high rate for one bus lane, and at a low rate for the other bus lane. All units can observe the situation and limit the snoop requests for the highly-loaded bus lane in their buffers at a lower level, e.g. lower than in the first scenario. This can guaranty efficient use of the lowly loaded bus lane and while the highly loaded bus lane can be used at maximum rate, because many units can have available snoop requests for it.

Figure 1:
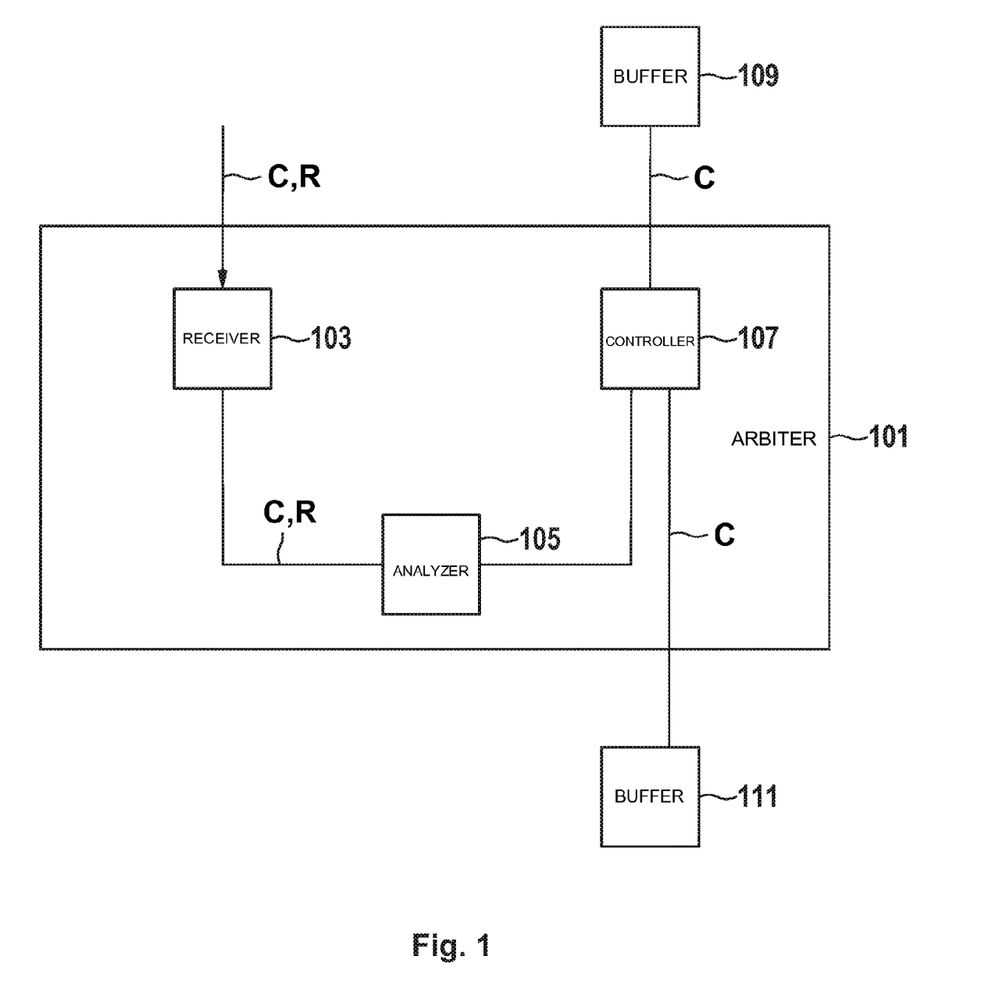
FIG. 1 illustrates a schematic block diagram of a first embodiment, according to the invention, for balancing loads of a plurality of bus lanes of a snooping-based bus.

In FIG. 1, a schematic block diagram of a first embodiment of an arbiter 101 for balancing loads of a plurality of bus lanes of a snooping-based bus is depicted.

The arbiter 101 has a receiver 103, an analyzer 105 and a controller 107.

The receiver 103 is adapted to receive snoop transactions C, R from the bus lanes of the snooping-based bus. The snoop transactions C, R can include snoop requests C and snoop responses R.

The receiver 103 is coupled with the analyzer 105. The receiver 103 can provide the received snoop transactions C, R to the analyzer 105.

The analyzer 105 is configured to analyze respective actual and expected loads of each of the bus lanes dependent on the snoop transactions C, R provided by the receiver 103.

The analyzer 105 is coupled with the controller 107. The controller 107 is coupled with a buffer 109 allocated to the snooping-based bus and with a buffer 111. The buffer 111 can provide outstanding snoop requests C.

The controller 107 is configured to provide a next snoop request C from the outstanding snoop requests C provided by the buffer 111 to the buffer 109 allocated to the bus lanes dependent on the analyzed loads of the bus lanes.

In particular, the controller 107 is configured to provide that snoop request C from the buffer 111 to the allocated buffer 109 next, which is allocated to a less loaded bus lane of the plurality of bus lanes according to the analyzed loads of the bus lanes.

Figure 2:
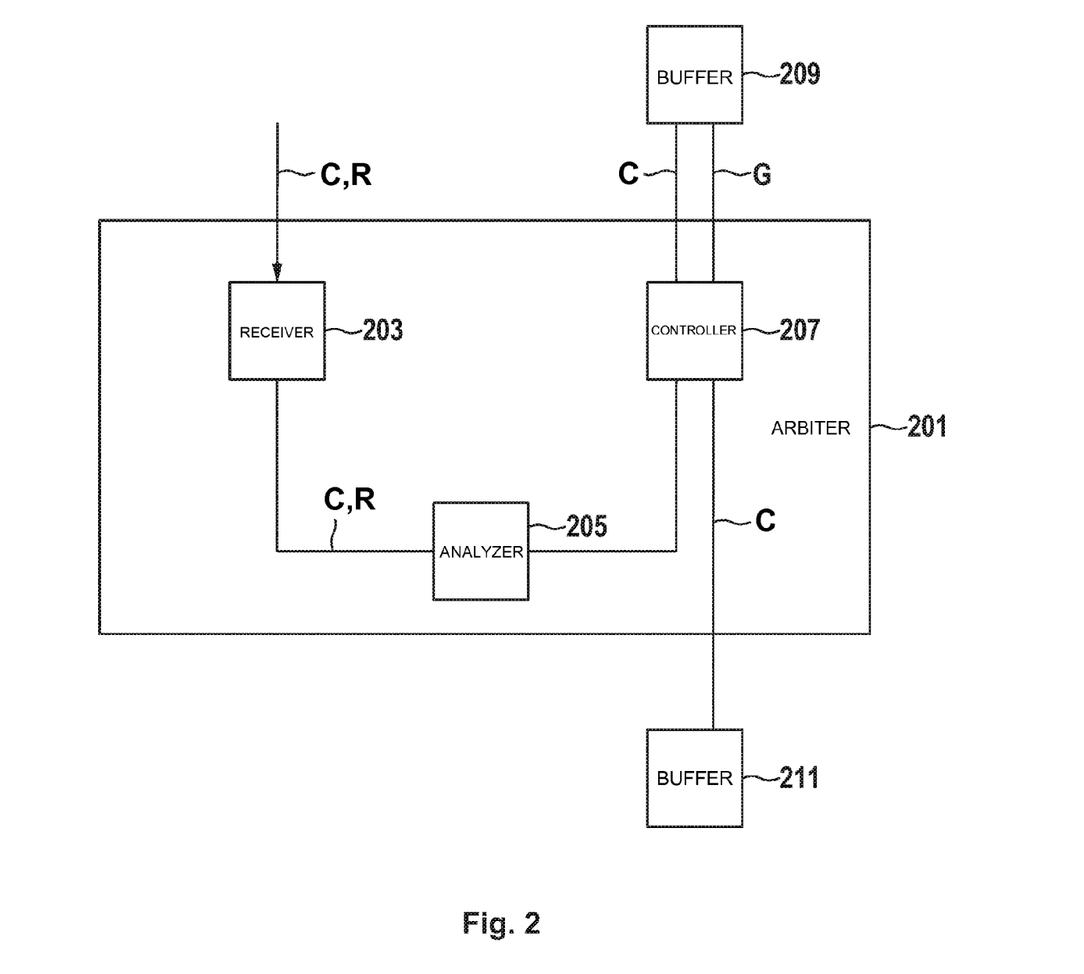
FIG. 2 illustrates a schematic block diagram of a second embodiment, according to the invention, for balancing loads of a plurality of bus lanes of a snooping-based bus.

Further, FIG. 2 illustrates a schematic block diagram of a second embodiment of an arbiter 201 for balancing loads of a plurality of bus lanes of a snooping-based bus. The arbiter 201 of FIG. 2 has a receiver 203, an analyzer 205 and a controller 207. The controller 207 is coupled towards a buffer 209 allocated to the snooping-based bus and towards a buffer 211 providing outstanding snoop requests C. The arbiter 202 has all features of the arbiter 101 of FIG. 1.

To avoid reiterations, the functionalities of the receiver 203, the analyzer 205 and the controller 207 described with reference to FIG. 1 are not explained again.

Further to FIG. 1, the controller 207 of the arbiter 201 has an interface. The interface interfaces the allocated buffer 209. The interface is configured to receive a snoop request grant signal G from the allocated buffer 209. The snoop request grant signal G can indicate the last snoop request forwarded from the allocated buffer 209 to the snooping-based bus. In this regard, the controller 207 of the arbiter 202 can be configured to provide the next snoop request C to the allocated buffer 209 in dependence on the outstanding snoop requests C as provided by the buffer 211 and in dependence on the received snoop request grant signals G.

Figure 3:
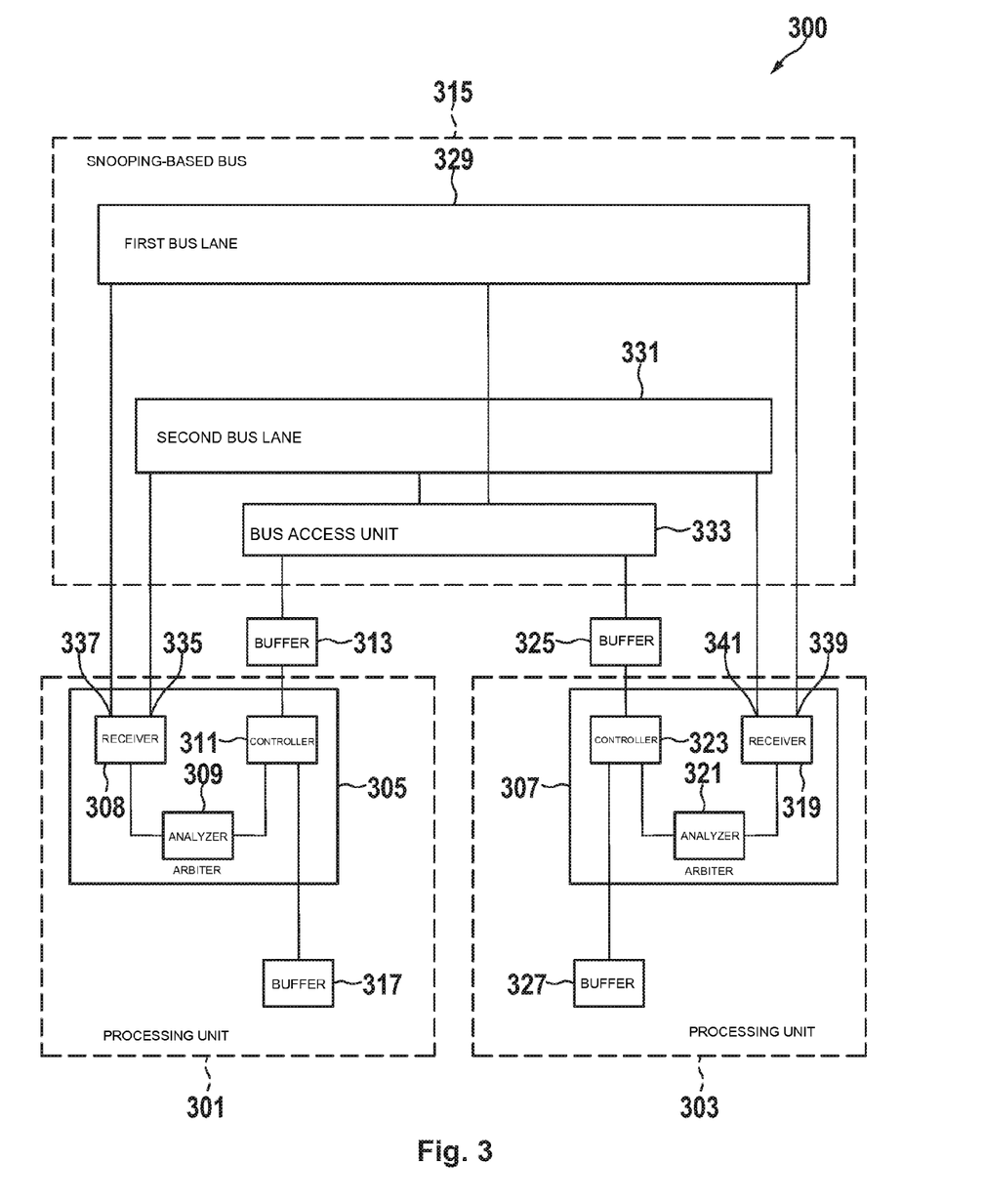
FIG. 3 illustrates a schematic block diagram of an embodiment of an arrangement having a number of processing units with an arbiter of FIG. 1.

FIG. 3 shows a schematic block diagram of an embodiment of an arrangement 300 having a number of processing units 301, 303. The respective processing unit 301, 303 has an arbiter 305, 307. The respective arbiter 305, 307 can be embodied as the arbiter 101 of FIG. 1 or as the arbiter 201 of FIG. 2. For example, the arbiter 305 has a receiver 308, an analyzer 309 and a controller 311. The controller 311 is coupled towards a buffer 313 allocated to a snooping-based bus 315 and towards a buffer 317 providing outstanding snoop requests.

In an analogous way, the processing unit 303 has a receiver 319, an analyzer 321 and a controller 323. The controller 323 is coupled with a buffer 325 allocated to the snooping-based bus 315 and to a buffer 327 providing outstanding snoop requests for the processing unit 303. Without loss of generality, the embodiment of FIG. 3 shows only two processing units 301, 303. Generally, the arrangement 300 of FIG. 3 can have a plurality of such processing units.

The snooping based bus 315 has a first bus lane 329 and a second bus lane 331. Without loss of generality, the snooping-based bus 315 of FIG. 3 has two bus lanes 329 and 331. Moreover, the snooping-based bus 315 has a bus access unit 333. The bus access unit 333 can be coupled to the buffer 313 allocated to the processing unit 301 and to the buffer 325 allocated to the processing unit 303. For interfacing with the first bus lane 329 and the second bus lane 331, the receiver 308 has a first interface 335 and a second interface 337.

The interfaces 335 and 337 of the receiver 308 are configured to receive snoop requests and snoops responses from the first bus lane 329 and the second bus lane 331. In an analogous way, the receiver 319 of the processing unit 303 has a first interface 339 interfacing with the first bus lane 329 and a second interface 341 interfacing with the second bus lane 331.

Further, the respective analyzer 309, 321 can have a plurality of counter entities. Each counter entity can be allocated to one bus lane 329, 331. Further, each counter entity can provide at least one count relating to the snoop transactions of the allocated bus lane 329 and 331, respectively.

In such a case, the controller 311, 323 can be configured to provide the next snoop request to the allocated buffer 313, 325 in dependence on the counts provided by the counter entities and in dependence on the outstanding snoop requests.

Figure 4:
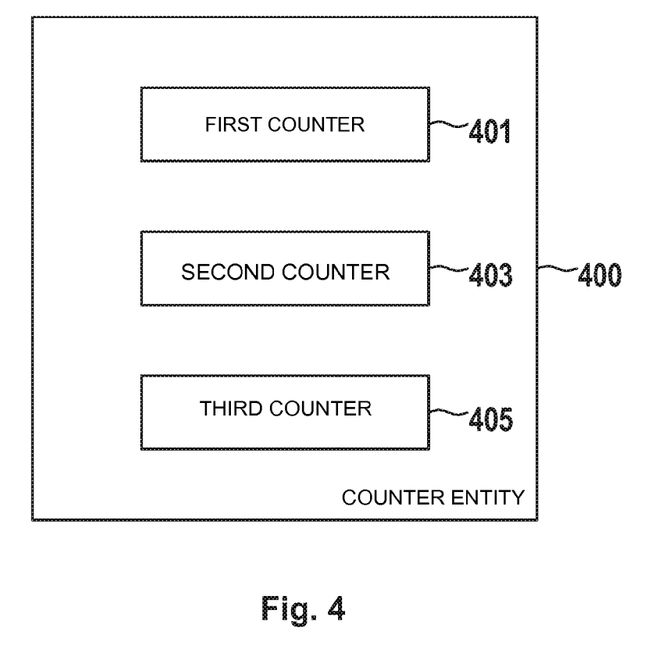
FIG. 4 illustrates a schematic block diagram of an embodiment of a counter entity of an arbiter according to the invention.

In this regard, FIG. 4 shows a schematic block diagram of an embodiment of a counter entity 400 of an arbiter. The counter entity 400 of FIG. 4 has a first counter 401, a second counter 403 and a third counter 405. The first counter 401 can be adapted to provide a count relating to outstanding snoop requests for the allocated bus lane. The second counter 403 can be adapted to provide a count relating to pending snoop transactions of the allocated bus lane. The third counter 405 can be adapted to provide a count relating to snoop responses received from the allocated bus lane.

Figure 5:
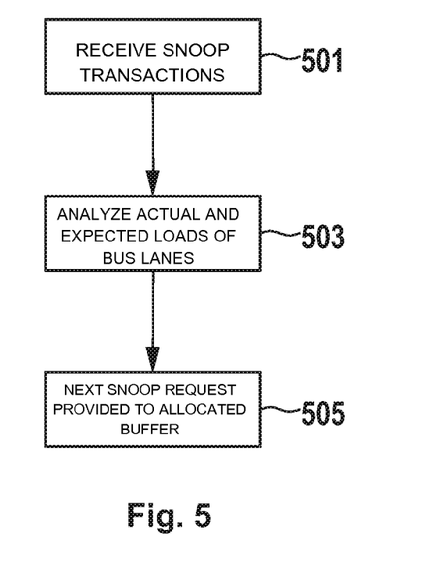
FIG. 5 illustrates a first embodiment, according to the invention, of a sequence of method steps for balancing loads of a plurality of bus lanes of a snooping-based bus.

FIG. 5 shows a first embodiment of a sequence of method steps for balancing loads of a plurality of bus lanes of a snooping-based bus. The first embodiment of the method for FIG. 5 has the following method steps 501, 503 and 505.

In the step 501, snoop transactions are received from the bus lanes. Each of the snoop transactions can have a snoop request and at least one snoop response.

In the step 503, respective actual and expected loads of each of the bus lanes are analyzed or determined dependent on the received snoop transactions.

In the step 505, a next snoop request is provided to a buffer allocated to the snooping-based bus dependent on the analyzed loads of the bus lanes. The next snoop request is selected from a number of outstanding snoop requests. The outstanding snoop requests are provided by a buffer, which is particularly part of the respective processing unit.

Figure 6:
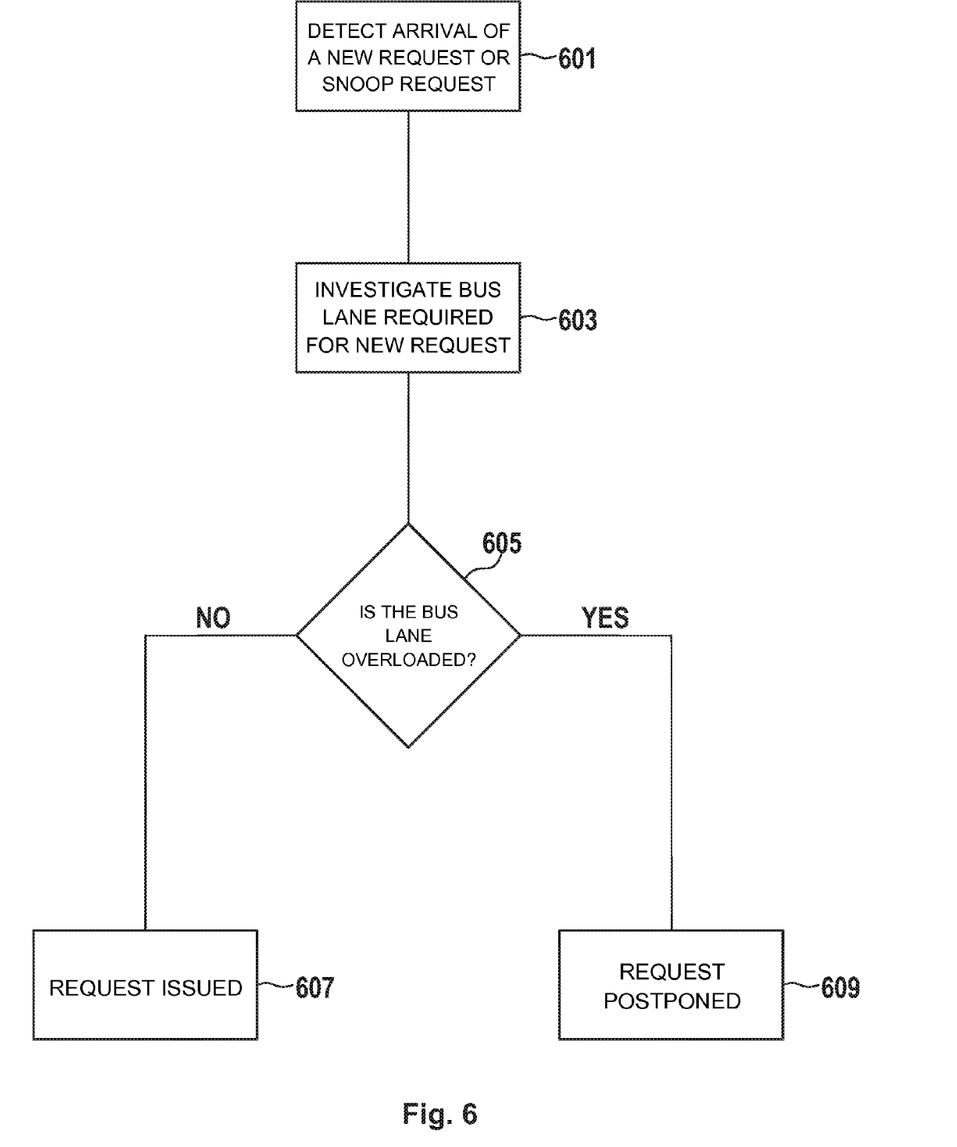
FIG. 6 illustrates a second embodiment, according to an embodiment of the invention, of a sequence of method steps for balancing loads of a plurality of bus lanes of a snooping-based bus.

FIG. 6 shows a second embodiment of sequence for method steps for balancing loads of a plurality of bus lanes of a snooping-based bus. The second embodiment of FIG. 6 is directed to the case that a new request arrives at the arbiter.

In the step 601, the arrival of a new request or snoop request is detected.

In the step 603, the bus lane required for the arrived new request is investigated. In particular, the respective counters for that bus lane are read.

Following to step 603, it is checked if the requested bus lane is overloaded or not in the step 605.

If the requested bus lane is not overloaded, the method proceeds with step 607. If the requested bus lane is overloaded, the method proceeds with step 609. In the step 607, the request is issued. In the step 609, the request is postponed.

Figure 7:
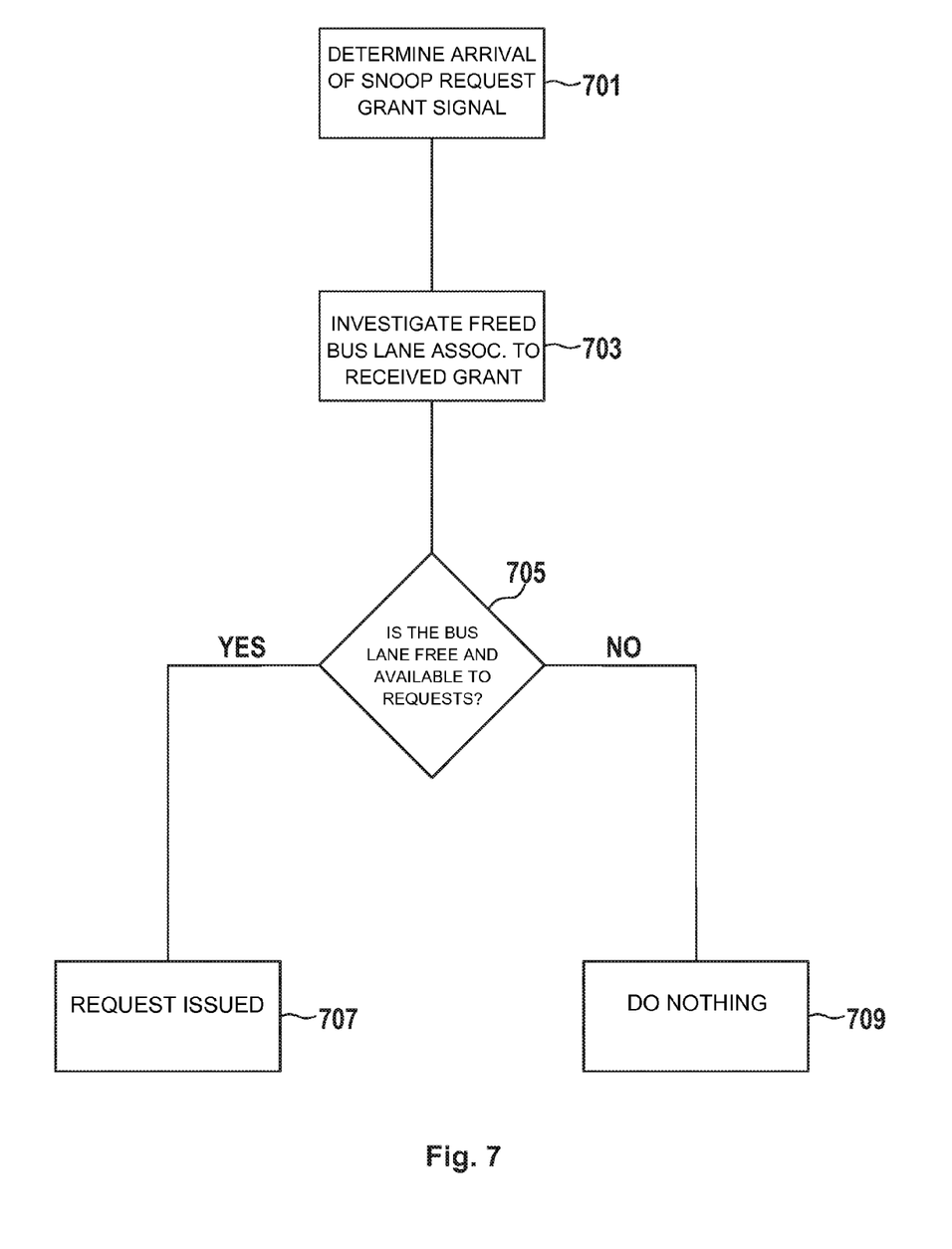
FIG. 7 illustrates a third embodiment, according to the invention, of a sequence of method steps for balancing loads of a plurality of bus lanes of a snooping-based bus.

FIG. 7 depicts a third embodiment of a sequence of method steps for balancing loads of a plurality of bus lanes of a snooping-based bus. The third embodiment of FIG. 7 is directed to the case that a snoop request grant signal arrives at the arbiter (see FIG. 2 for example).

In the step 701, an arrival of a snoop request grant signal, also referenced as grant, is determined.

In the step 703, the freed bus lane associated to the received grant is investigated. In particular, the counters for that bus lane are read and it is checked for requests for that bus lane.

Following to step 703, it is checked if that bus lane is now free and available to requests in a step 705.

If the step 705 is answered yes, the method proceeds with step 707. If the step 707 is answered no, the method proceeds with step 709. In the step 707, the request is issued. In the step 709, it is decided to do nothing.

All above-mentioned embodiments of the methods of the present invention can be embodied by respective means to be a respective embodiment of the arbiter of the present invention.

What has been described herein is merely illustrative of the application of the principles of the present invention. Other arrangements and systems can be implemented by those skilled in the art without departing from the scope and spirit of this invention.

What is claimed is:

1. A system for balancing loads of a plurality of bus lanes of a snooping-based bus, the system comprising:
    a receiver for receiving snoop transactions from the bus lanes, each of the snoop transactions having a snoop request and at least one snoop response;
    an analyzer for analyzing respective actual and expected loads of each of the bus lanes according to the received snoop transactions; and
    a controller for providing a next snoop request from a number of outstanding snoop requests to a buffer allocated to the system, wherein the buffer is allocated to the system according to analyzed data loads of the bus lanes.

2. The system according to claim 1, wherein the controller is configured to provide the next snoop request to the allocated buffer according to the analyzed loads of the bus lanes, and wherein the snoop request is allocated to a less loaded bus lane of the plurality of bus lanes according to the analyzed loads of the bus lanes.

3. The system according to claim 1, wherein the receiver has a plurality of interfaces, each of the plurality of interfaces being coupled to an allocated bus lane of the plurality of bus lanes, and wherein each of the plurality of interfaces is configured to receive snoop responses from the allocated bus lane.

4. The system according to claim 2, wherein the receiver has a plurality of interfaces, each of the plurality of interfaces being coupled to an allocated bus lane of the plurality of bus lanes, and wherein each of the plurality of interfaces is configured to receive snoop responses from the allocated bus lane.

5. The system according to claim 3, wherein the analyzer is configured to analyze the respective load of the allocated bus lane of the plurality of bus lanes dependent on at least the snoop responses received by the allocated interfaces.

6. The system of claim 5, wherein the analyzer has a plurality of counter entities, each counter entity of the plurality of counter entities being allocated to one bus lane of the plurality of bus lanes, and wherein each counter entity provides at least one count relating to the snoop transactions of the allocated bus lane.

7. The system according to claim 6, wherein the controller is configured to provide the next snoop request to the allocated buffer in dependence on the counts provided by the counter entities and the outstanding snoop requests.

8. The system according to claim 6, wherein each counter entity has a first counter for providing a count relating to outstanding snoop requests for the allocated bus lane, a second counter for providing a count relating to pending snoop transactions of the allocated bus lane, and a third counter for providing a count relating to snoop responses received from the allocated bus lane.

9. The system according to claim 8, wherein the controller is configured to provide the next snoop request to the allocated buffer in dependence on the counts of the first, the second, and the third counters of the counter entities.

10. The system according to claim 6 further comprising: an interface being coupled to the allocated buffer and configured to receive a snoop request grant signal from the allocated buffer, wherein the snoop request grant signal indicates the last snoop request forwarded from the allocated buffer to the snooping-based bus.

11. The system according to claim 10, wherein the controller is configured to provide the next snoop request to the allocated buffer in dependence on (i) the counts provided by the counter entities, (ii) the outstanding snoop requests, and (iii) the received snoop request grant signals.

12. The system according to claim 1, further comprising: an interface for interfacing with the plurality of bus lanes.

13. A Method for balancing loads of a plurality of bus lanes of a snooping-based bus, the method comprising the steps of:
receiving snoop transactions from the bus lanes, each of the snoop transactions having a snoop request and at least one snoop response;
analyzing respective actual and expected loads of each of the bus lanes according to the received snoop transactions; and
providing a next snoop request from a number of outstanding snoop requests to a buffer allocated to the snooping-based bus, wherein the buffer is allocated to the system according to the analyzed data loads of the bus lanes.

14. The method according to claim 13, further comprising the steps of:
receiving a new snoop request;
investigating the new snoop request by reading a counter associated with each bus lane, respectively;
determining whether at least one bus lane of the plurality of bus lanes is overloaded based on the investigation step; and
issuing the new request if the at least one bus load is not overloaded, otherwise, postponing the request.

15. The method according to claim 14, further comprising the steps of:
receiving a snoop request grant signal associated with a bus lane;
determining if the bus lane associated with the grant signal is free by reading counters of the bus lane associated with the grant signal to check for requests for the bus lane associated with the grant signal; and
issuing the request associated with the grant signal if it is determined, based on the determining step, that the bus lane associated with the grant signal is free and available, otherwise postponing the request.

16. A computer readable storage medium tangibly embodying a computer readable program code having non-transitory computer readable instructions which, when implemented, cause a computer to carry out the steps of the method according to claim 13.

* * * * *